M. WONSER.
Carriage Wheel.
No. 103114       PATENTED MAY 17 1870
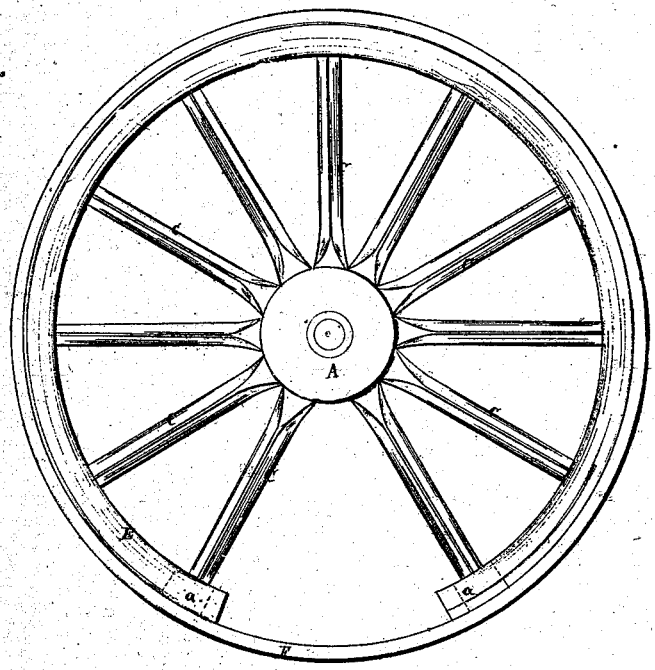
Fig. 1.
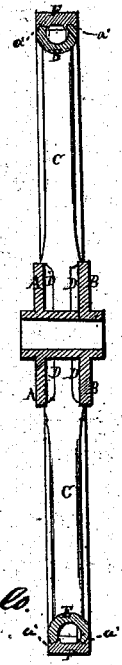
Fig. 2.
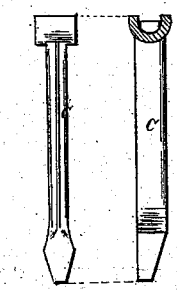
Fig. 3.
Fig. 4.
Fig. 5.
Inventor
M. Wonser
per Burridge & Co.
Witnesses
J. H. Burridge
D. B. Humphrey

United States Patent Office.

MILEDEN WONSER, OF NORWALK, OHIO.

Letters Patent No. 103,114, dated May 17, 1870.

IMPROVED CARRIAGE-WHEEL.

The Schedule referred to in these Letters Patent and making part of the same

*To all whom it may concern:*

Be it known that I, MILEDEN WONSER, of Norwalk, in the county of Huron and State of Ohio, have invented a certain new and improved Carriage-Wheel; and I do hereby declare that the following is a full, clear, and complete description of the same, reference being had to the accompanying drawings making part of this specification, in which drawings—

Figure 1 is a side view of the wheel.
Figure 2, a transverse section.
Figure 3, detached sections.
Figures 4 and 5 are detached sections.

Like letters of reference refer to like parts in the several views.

Objective.

This invention relates to the tire and felloe of a wheel, the same being constructed of metal, the felloe consisting of a semi-tube, to which the tire is secured by means of continuous grooves in said tire, into which the edges of the felloe are received in the manner as follows:

In fig. 1, A B represent the nave of the wheel, and which consists of two metallic cheeks, between which the tenons of the spokes C are inserted in mortises formed by the feathers D projecting from the sides of the cheeks immediately opposite each other, as shown in fig. 2.

E is the felloe, which, as above-said, consists of a semi-tube that may be either one entire piece, or put together in sections, more or less in number. An inside view of a detached section is shown in fig. 5, and a transverse section of which is shown in fig. 2.

Into this felloe the outer end of the spokes is inserted, as shown in fig. 3.

F is the tire, which may be of the ordinary thickness.

On the inside of the tire, along the outer edges, is cut a groove, G, fig. 4, into which the edges of the felloe are fitted, as shown in fig. 2, in which it will be observed that the tubular curvature of the felloe forms with the inside of the tire a continuous tube or hollow felloe. A wheel thus constructed with a tubular felloe combines greater strength, elasticity, and lightness, in proportion to its weight, than one ordinary wooden one, and will, therefore, last much longer in actual wear, and is unaffected by the wet, so that the tire will remain tight thereon when once properly set.

As above said, the tire is retained upon the felloe by means of the grooves into which the edges of the felloe are lodged and secured by the flanges of the grooves lapping over the sides of the felloe, as seen at $a'$, fig. 2, thereby preventing it from working off, should it become loose.

In this manner of securing the tire, no bolts are used, and, as will be obvious, the felloe and tire will always be true in their relation to each other, as no lateral displacement of the tire can take place.

In order to obtain more support for the outer tenons of the spoke in their attachment to the felloe, a block, indicated by the dotted lines $a$, fig. 1, is fitted to the tube, into which the tenons project, thereby giving to them a stronger bearing and holding-surface. This, however, is only required for heavy wheels, the lighter ones for buggies and that class of vehicles are of sufficient strength without such blocks.

Claim.

What I claim as my invention, and desire to secure by Letters Patent, is—

The flanged and grooved tire F, tubular felloe E, in combination with the spokes C, and a hub, arranged as and for the purpose substantially set forth.

MILEDEN WONSER.

Witnesses:
W. H. BURRIDGE,
J. H. BURRIDGE.